(No Model.) 2 Sheets—Sheet 1.

E. ANDREWS.
SAW HANDLE.

No. 508,798. Patented Nov. 14, 1893.

(No Model.)  2 Sheets—Sheet 2.

E. ANDREWS.
SAW HANDLE.

No. 508,798. Patented Nov. 14, 1893.

Witnesses:
J. B. McGinn.
Wm. W. McCartney.

Inventor:
Emanuel Andrews
by Frank L. Dyer,
Attorney.

UNITED STATES PATENT OFFICE.

EMANUEL ANDREWS, OF WILLIAMSPORT, PENNSYLVANIA.

SAW-HANDLE.

SPECIFICATION forming part of Letters Patent No. 508,798, dated November 14, 1893.

Application filed January 2, 1891. Serial No. 376,553. (No model.)

*To all whom it may concern:*

Be it known that I, EMANUEL ANDREWS, a citizen of the United States, residing at Williamsport, in the county of Lycoming and State of Pennsylvania, have invented certain new and useful Improvements in Saw-Handles, of which the following is a specification.

The object of my invention is to strengthen the wooden handles of back, compass and pruning saws, which are ordinarily made open whereby such handles will be applicable to ordinary hand and other saws. This object I attain in the following manner, which I will now proceed to describe, reference being had to the accompanying drawings, in which—

Figure 1:
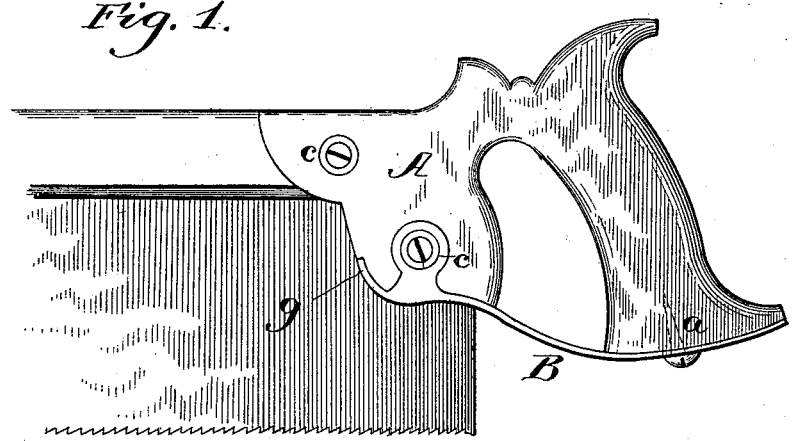
Figure 2:
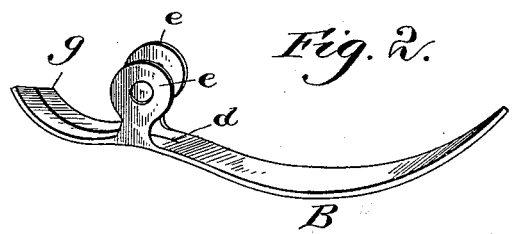
Figure 3:
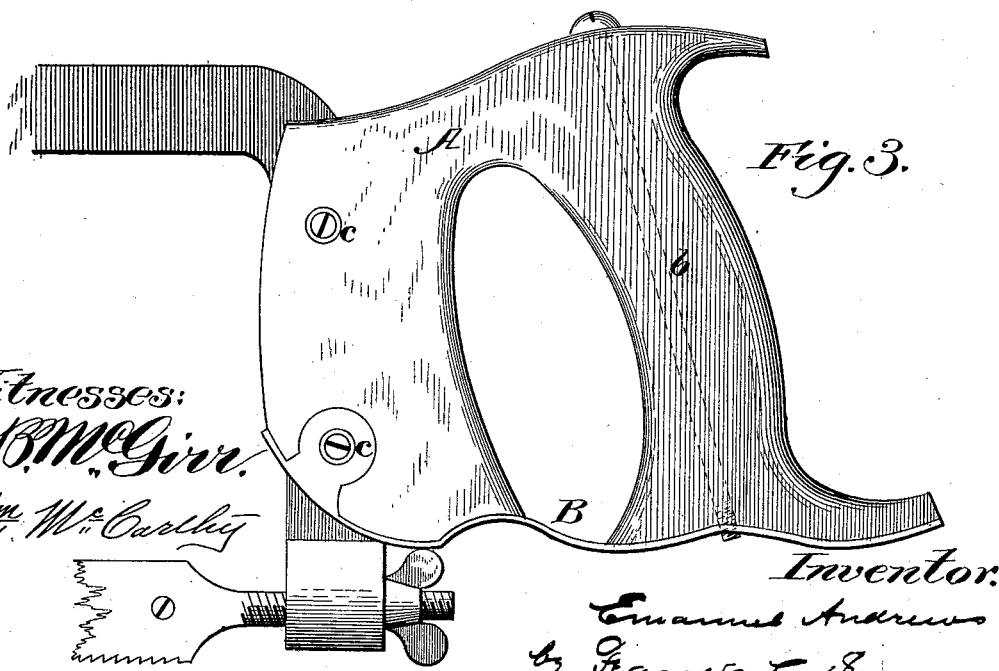
Figure 4:
Figure 5:
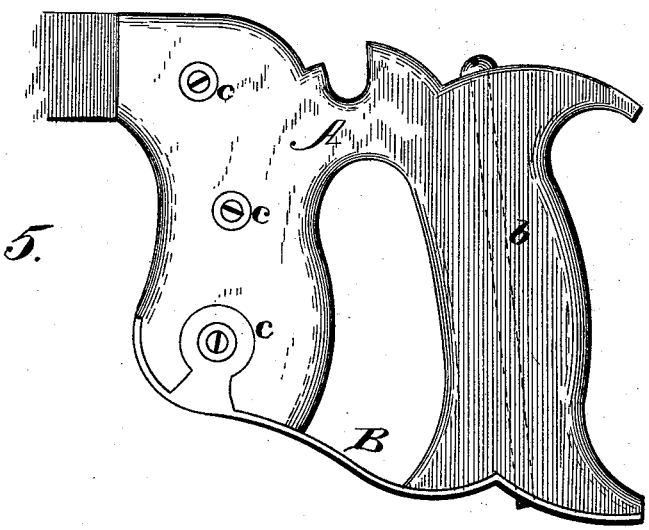
Figure 6:

Figure 1 shows my invention applied to a back-saw handle. Fig. 2 is my device detached from the handle. Fig. 3 shows my invention applied to a meat saw handle. Fig. 4 is my device detached from the handle. Fig. 5 shows my invention applied to an ordinary hand saw handle. Fig. 6 is my device detached from the handle.

A represents a saw handle made of wood both as to the handle proper and as to the part embracing the blade. B is a metal support between the body of the handle and the grip or hand-hold which is attached to saw handle A by screw $a$, as shown in Fig. 1 or by a bolt $b$ passing entirely through the handle as shown in Fig. 5. The support B is provided at its forward end with a slot $d$ therein, through which the saw blade extends, and with the twin lugs $e$, $e$, which extend up around that portion of the handle surrounding the blade. These twin lugs $e$, $e$, are provided with openings $f$, therein, through which extends the usual saw screw $c$ and by means of which the said support B will be firmly held in place. The foot or front $g$, of the support B is curved slightly, bearing against the wooden part of the handle embracing the saw blade as shown, so that should the support accidentally strike the work in operation, the tendency will be to force the support against that portion of the handle around the blade instead of against the hand-hold proper.

All open saw handles are liable to breakage from an accidental fall or an excessive thrust when in use. It will be readily seen that the application of my metal support as shown will add strength to such handles, and is a protection against such breakage.

In the application of my metal support to open handles for ordinary hand saws, the same may be made so that its weight may balance the saw in the hand of the user, more thoroughly than such saws usually do.

What I claim as new, and desire to secure by Letters Patent, is—

The combination with an open saw handle made of wood, both as to the handle proper, and as to the portion thereof which surrounds the blade, of a metal support B, provided with a foot or end $g$, curved up in front of that portion of the wooden handle which embraces the saw blade, and slitted and adapted to straddle the saw blade, and having twin lugs $e$, $e$, surrounding that portion of the handle around the blade, and engaging the saw screw, substantially as described.

EMANUEL ANDREWS.

Witnesses:
ELMER E. COWDRICK,
EDWARD B. ANDREWS.